Patented Mar. 24, 1936

2,034,941

UNITED STATES PATENT OFFICE 2,034,941

PROCESS FOR BREAKING PETROLEUM EMULSIONS

Melvin De Groote, St. Louis, Bernhard Keiser, Webster Groves, and Arthur F. Wirtel, Richmond Heights, Mo., assignors to Tretolite Company, Webster Groves, Mo., a corporation of Missouri No Drawing. Application November 12, 1934, Serial No. 752,719

5 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil", and "bottom settlings".

The object of our invention is to provide a novel, inexpensive and efficient process for separating emulsions of the kind referred to into their component parts of oil and water or brine.

Briefly described, our process consists in subjecting a petroleum emulsion of the water-in-oil type, to the action of a treating agent or demulsifying agent of a particular composition, hereinafter described, thereby causing the emulsion to break down and separate into its component parts of oil and water or brine, when the emulsion is permitted to remain in a quiescent state after such treatment, or subjected to an equivalent separatory procedure.

The treating agent or demulsifying agent contemplated for use in our process, is a blown product, obtained by blowing ricinoleic acid, with or without its associated polymers, in the same manner employed to produce conventionally blown castor oil.

Conventionally blown castor oil has been used in the demulsification of crude oil. It may be used in the manner described in U. S. Patent No. 1,929,399, to Fuchs, dated October 3, 1933. Conventionally blown castor oil or other similar oils may also be used in the demulsification of crude oil, in specific mixtures of the kind described in copending application for patent of De Groote and Wirtel, Serial No. 752,722, filed November 12, 1934, and in percular mixtures of the kind described, in co-pending application for patent of Charles N. Stehr, Serial No. 752,713, filed November 12, 1934.

Blown oils of the conventional kind were originally intended for uses other than in the demulsification of crude oil. They were intended for use in lubricants, for use as plasticizers in the manufacture of artificial leather, and for use in the manufacture of polishes such as furniture polish, etc. So far as we are aware, the type of blown oil that has been commercially used for sometime for breaking oil field emulsions, has been derived entirely from castor oil. Certain blown oils, either commercially available or readily manufactured and derived solely from oils other than castor oil, such as from rapeseed oil, corn oil, or cottonseed oil, have not been found to be particularly effective in the demulsification of crude oil. Similarly, blown oil derived by the oxidation of oleic acid has not proven to be a particularly effective demulsifying agent. With the application of conventionally blown castor oil in the field of crude oil demulsification, there has been a development in the direction of the production of blown oils intended solely for the demulsification of crude oil, and said blown oils may often be unsuitable for use in certain other arts where conventionally blown oils ordinarily are acceptable or adaptable. The conventionally available blown oils are ordinarily prepared largely with the physical properties thereof in mind as the ultimate criteria; particularly, the specific gravity, viscosity, color, freedom from gumminess, etc. It is evident that such physical characteristics are without significance in determining the value of such blown oils in the resolution of petroleum emulsions.

The present process contemplates the breaking of oil field emulsions by means of blown recinoleic acid produced by an oxidation process of the kind commonly employed in the manufacture of conventional blown castor oils and the like. The conversion of castor oil into ricinoleic acid results in an added cost, because there is a loss in weight, due to the loss of glycerine. This loss approximates 10%, by weight, of the original material. Furthermore, such hydrolysis of castor oil is an additional item of expense, because it involves an added manufacturing operation. Since hydrolysis invariably results in a darkened product, it is almost impossible to produce a pale blown "castor oil" by the oxidation of ricinoleic acid. Certain uses of ordinary blown castor oil require a pale color, and therefore, it is obvious that the ordinary market for blown ricinoleic acid in competition with the market for blown castor oil is rather limited. In view of the added cost and higher price of blown ricinoleic acid, as compared with blown castor oil, such market is practically non-existent. We do not know that blown ricinoleic acid has been previously manufactured for any commercial purpose whatsoever. We do not know whether blown ricinoleic acid has any utility in any art other than the demulsification of crude oil. The present process is concerned solely with the application of blown ricinoleic acid for the purpose of breaking crude oil emulsions.

Before indicating the manner in which the oxidation of ricinoleic acid yields products other than those obtained by the oxidation of castor oil, it may be well to indicate in a general manner the mechanism underlying the oxidation of reactive fatty bodies. The chemistry of such reactions is not completely understood.

"Synthetic Organic Chemicals", vol. 8, No. 1, page 3, states:

"The mechanism of oxidative reactions of fatty acids differs greatly with the structure of the substrate and the nature of the oxidizing agent.

"Ethylene linkages, branched chains, and other reactive groups such as hydroxyl, render the fatty acid molecule rather vulnerable to oxidation. These modified reactions, however, are more characteristic of the particular type of bond or group than of the fatty acids themselves. Highly unsaturated acids exhibit auto-oxidative polymerization as do other non-acidic unsaturated compounds.

"The prevalence of the 9-10 position of the first ethylenic linkage and the avoidance of conjugated systems in naturally occurring unsaturated acids are very characteristic features as yet entirely unexplained. These acids usually possess the following structure;

$$R-CH=CH-CH_2-CH=CH-(CH_2)_7-COOH$$

The behavior of this type of linkage in auto-oxidations is not very well known."

U. S. Patent No. 1,969,387, to Tumbler, dated August 7, 1934, states page 1, line 41:

"* * *, if the oleic acid is preliminarily treated with air, oxygen, or any other oxidizing substances so that an oxidation product of oleic acid results. The treatment comprises blowing the oleic acid with air until a frothy mass results. The reactions which take place are probably as follows:

$$2C_{17}H_{33}COOH + O_2 + H_2O \rightarrow 2C_{18}H_{34}O_2(OH)_2$$

dihydroxystearic acid $$C_{18}H_{34}O_2(OH)_2 + 3O_2 \leftarrow 2C_7H_{14}(COOH)_2 2H_2O$$

azelaic acid. It is my theory that partial oxidation and polymerization of the oleic acid occurs, though I am not prepared to state accurately the degree to which the above reactions take place. With particular reference to castor oil, which contains a predominant amount of triricinolein, the glyceride of ricinoleic acid $$C_{17}H_{32}.(OH).(COOH),$$

the blowing with air partially oxidizes it into a product which is known as 'pale blown' castor oil."

It is to be noted that Tumbler points out that one mole of oleic acid may yield two moles of an acid of lower molecular weight having 8 carbon atoms, such as azelaic acid. Similarly, the oxidation of ricinoleic acid and probably of triricinolein as well, would yield something akin to one mole of azelaic acid, plus one mole of hydroxy azelaic acid, which may be assumed to be the same composition of azelaic acid, except that one hydrogen has been replaced by an hydroxyl group. Not only is this true in regard to a fatty acid or glyceride in which an alcoholiform hydroxyl is present prior to oxidation such as in the case of castor oil, but it is also true in respect to the oxidation of an oil or acid in which no hydroxyl group is present. For instance, as Tumbler in the previously quoted patent indicates, oleic acid may be changed to dihydroxy stearic acid and dihydroxy stearic acid may be further changed to yield two moles of azelaic acid. However, the same reaction which may take place between azelaic acid and the hypothetical hydroxy azelaic acid previously referred to, undoubtedly does take place between azelaic acid and dihydroxy stearic acid with the formation of an ester acid, that is, an acid in which an alcoholiform hydroxyl of one fatty acid molecule is combined with the carboxylic hydrogen of another fatty acid molecule. Thus, one might form azelayl hydroxy azelaic acid, or in the oxidation of oleic acid, one could form azelayl dihydroxy stearic acid. It need not be inferred that the actual compounds which are formed are of exactly this indicated composition, but at least these reactions of the designated bodies are characteristic of what actually occurs.

We have recognized that the production of ordinary blown oils from glycerides involves at least three separate types of reaction, even after excluding aldehyde formation, which may take place in certain instances: (a) Oxidation characterized by the adsorption of oxygen, as, for instance, an atom of oxygen saturating the ethylene linkage of a glyceride or fatty acid; (b) reaction of this added oxygen atom with a molecule of water to yield hydroxyl groups, that is, formation of oxy-acids; and (c) the formation of ester acids from these oxy-acids with the reliberation of a molecule of water which may again serve in the transformation of an adsorbed oxygen atom into hydroxyl groups. Thus, we consider that the first small amount of water which is formed in the reaction, or that the water present in the air or oxygen used for blowing the fatty reactive oil or acid, is in a large sense, a catalyst, although apparently it enters into reaction and is constantly regenerated and used over again.

However, the heating of ricinoleic acid alone, in absence of air, produces a certain type of reaction which does not occur in the heating of the ordinary naturally-occurring glyceride, such as castor oil, corn oil, etc., and it does not occur in the heating of oleic acid or similar non-hydroxylated fatty acids. The reaction referred to is the polymerization with the loss of water in the production of diricinoleic acid, triricinoleic acid, etc. Reference is made to U. S. Patent No. 1,901,163, to Carl G. Hinrichs, dated March 14, 1933. This patent indicates how various polyricinoleic acids are formed, and also their application in the treatment of crude oil emulsions. We have found that when ricinoleic acid is blown in the same manner as that which would ordinarily be employed for producing blown castor oil, for instance, heating ricinoleic acid to about 150° C., and then blowing for five to fifteen hours at about 175° to 225° C., that one obtains a product, which, in the treatment of crude oil emulsions, is different from conventionally available blown castor oil, or from polyricinoleic acids of the kind described in the aforementioned Hinrichs patent. It may be possible that the oxidation of ricinoleic acid results in the formation of a different product than castor oil, partly because of the absence of the glyceryl radical in the ricinoleic acid. However, this explanation can only be a partial explanation, because the oxidation or blowing of oleic acid, in which a glyceryl radical also is absent, does not yield an effective demulsifying agent, but does yield a heavier bodied product. In other words, it appears that the blowing or oxidation of ricinoleic acid by means of air or oxygen results in a mixture of complex compounds involving reactions of an even more complicated type than those reactions which occur in the manufacture of blown castor oil, and which have been referred to above. We have found that the reagent so obtained is more effective on certain crude oil emulsions than blown castor oil, blown oleic acid, polyricinoleic acids, or mixtures of the same.

Since ricinoleic acid tends to polymerize somewhat even at ordinary temperature, and especially shows a marked tendency at 100° C., it often happens that ricinoleic acid, as prepared, contains some polymers, that is, some polyacids. It is understood that such ricinoleic acid is just as satisfactory as a raw material for the production of the reagent employed in our process as ricinoleic acid which is free from polymers, because the initial heating of the ricinoleic acid prior to the actual oxidation step naturally induces polymerization. It is to be understood that in the hereto attached claims, the expression "ricinoleic acid" is intended to mean ricinoleic acid or partially polymerized ricinoleic acid, that is, a mixture of ricinoleic acid and its polymers.

The word "saponification" is used in the chemistry of fats to indicate the conversion of fats, that is, esters, into fatty acids or their salts. The conversion of a fat into the sodium salt, that is, soap-making, is frequently referred to as "saponification". Likewise, the neutralization of a fatty acid is referred to as "saponification". The saponification number is an analytical index, which indicates the amount of alkali required to replace the glycerol ester or acidic hydrogen, or the like.

When fats are saponified so as to yield the corresponding fatty acids, the process is sometimes referred to as acid saponification, because the reaction is commonly carried out in the presence of an acid, such as sulfuric acid, and also in the presence of a catalyst, such as a Twitchell reagent or a Petroff reagent. Often it is conducted at an elevated temperature above the boiling point of water, and sometimes under pressure. Processes intended to produce similar results may depend upon hydrolysis with steam in presence of small amounts of alkalis, or on reaction with water in the presence of enzymes. Naturally, a fat might be saponified with alkali so as to produce the sodium salt, and this salt might be dissolved in water and the fatty acid liberated by means of a dilute mineral acid, such as hydrochloric acid.

Having obtained ricinoleic acid or ricinoleic acid admixed with some of its polymers, by any one of such processes involving the use of castor oil, we proceed to prepare our preferred reagent in the following manner: Approximately 1,000 pounds of such ricinoleic acid are placed in a vessel of the conventional kind, equipped with suitable means for heating the same to approximately 125° to 165° C. Adequate room should be allowed for frothing and expansion. There should be suitable means for injecting air into the mass in the form of a stream of small bubbles. After the temperature is raised to approximately 135° to 140° C., oxidation with air is started in the customary manner. One may employ dried air or one may employ air with its normal moisture content. We prefer to use ordinary air with its normal moisture content. A temperature rise of approximately 50° to 75° C. may be allowed, and the process may be completed in about 8 to 12 hours, depending in part on the amount of air injected into the mass. After the completion of the oxidation step, and after the mass is cooled to about 60° to 70° C., we prefer to add an equal volume of kerosene so as to reduce the viscosity of the demulsifying agent and make it more adaptable for use in various mechanical devices, such as lubricators, pumps, etc., commonly employed to inject the demulsifying agent into the crude emulsion. After the addition of kerosene, we prefer to add enough triethanolamine to neutralize the acidic hydrogen which may still be present.

Blown ricinoleic acid of the kind herein described may be used alone or may be used in mixture with other well known demulsifying agents. It is understood that this blown ricinoleic acid may be mixed with any suitable solvent, such as petroleum hydrocarbon distillates, including kerosene, gasoline, etc.; coal tar distillates, including benzene, solvent naphtha, xylene, etc.; or one may employ any suitable solvent conventionally employed in the demulsification of crude oil emulsion.

We do not find it desirable to treat blown recinoleic acid of the kind herein described with caustic soda or caustic potash. Under such circumstances, not only is the acidic hydrogen neutralized, but in addition thereto esters or compounds of allied structure are saponified and decomposed. We find it most desirable either to use the blown ricinoleic acid as such, or after the addition of triethanolamine or the like, because by using this last mentioned substance, there is no danger of decomposing the esters or ester-like bodies.

The superiority of the reagent or demulsifying agent contemplated by our process is based upon its ability to treat certain emulsions more advantageously and at a somewhat lower cost than is possible with other known demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve said oil field emulsions in a certain number of cases which cannot be treated as easily and at so low a cost with the demulsifying agents heretofore available.

In practicing our process, a treating agent or demulsifying agent of the kind described above may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately one part of treating agent to 500 parts of emulsion, up to one part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500, above referred to, may be required. In treating fresh emulsion, i. e., emulsions that will yield readily to the action of chemical demulsifying agents, the ratio of 1:30,000, above referred to, may be sufficient to produce highly satisfactory results. In general, we have found that for an average petroleum emulsion a ratio of 1 part of treating agent to 5,000 parts of emulsion will usually be found to produce commercially satisfactory results.

Having thus described our invention, what we claim as new and desire to secure by Letters Patent is:

1. A process for breaking petroleum emulsions of the water-in-oil type, which consists in subjecting the emulsion to the action of a demulsifying agent produced or derived by subjecting ricinoleic acid to conventional oxidation, by means of a gaseous, oxygen-containing medium in which the oxygen is present in a chemically uncombined form.

2. A process for breaking petroleum emulsions of the water-in-oil type, which consists in subjecting the emulsion to the action of a demulsifying agent produced or derived by subjecting ricinoleic acid to conventional oxidation, by means of a gaseous, oxygen-containing medium in which the oxygen is present in a chemically uncombined form, and subsequently, diluting it with a suitable solvent.

3. A process for breaking petroleum emulsions of the water-in-oil type, which consists in subjecting the emulsion to the action of a demulsifying agent produced or derived by subjecting ricinoleic acid to conventional oxidation, by means of a gaseous, oxygen-containing medium in which the oxygen is present in a chemically uncombined form, and subsequently, diluting it with kerosene.

4. A process for breaking petroleum emulsions of the water-in-oil type, which consists in subjecting the emulsion to the action of a demulsifying agent produced or derived by subjecting ricinoleic acid to conventional oxidation, by means of a gaseous, oxygen-containing medium in which the oxygen is present in a chemically uncombined form, and subsequently, diluting it with an approximately equal volume of kerosene.

5. A process for breaking petroleum emulsions of the water-in-oil type, which consists in subjecting the emulsion to the action of a demulsifying agent produced or derived by subjecting ricinoleic acid to conventional oxidation, by means of a gaseous, oxygen-containing medium in which the oxygen is present in a chemically uncombined form and subsequently, diluting it with an approximately equal volume of kerosene, followed by neutralization of the free acidic hydrogen by means of triethanolamine.

MELVIN DE GROOTE.
BERNHARD KEISER.
ARTHUR F. WIRTEL.